UNITED STATES PATENT OFFICE.

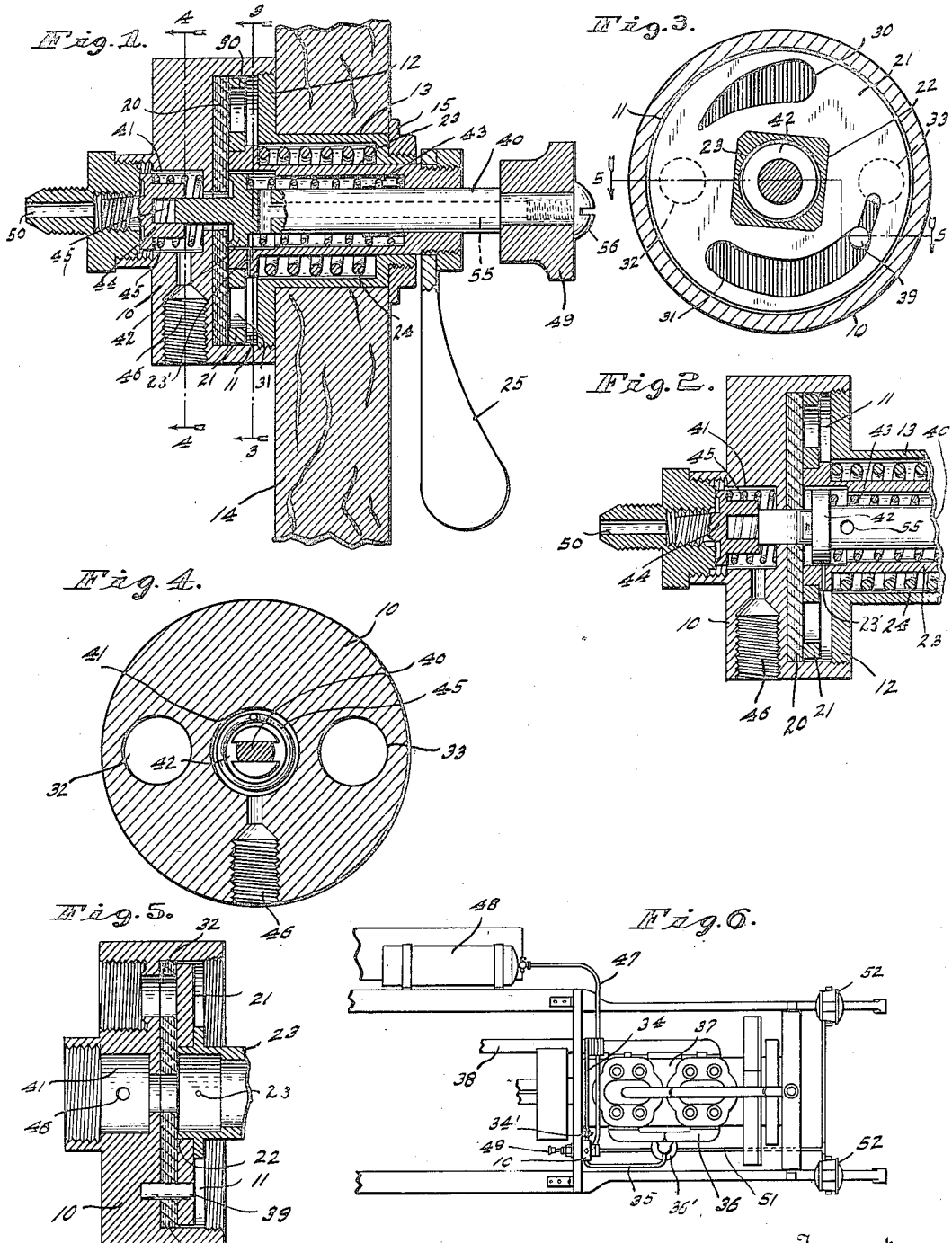

CHARLES M. JEWELL, OF FRANKFORT, INDIANA, ASSIGNOR TO JEWELL AUTO DEVICE EQUIPMENT COMPANY, A CORPORATION OF CALIFORNIA.

COMBINED LIGHTING-VALVE, PRIMER, AND AUXILIARY AIR-VALVE.

1,151,793.

Specification of Letters Patent.

Patented Aug. 31, 1915.

Application filed July 3, 1913. Serial No. 777,137.

*To all whom it may concern:*

Be it known that I, CHARLES M. JEWELL, a citizen of the United States, residing at Frankfort, in the county of Clinton and State of Indiana, have invented a new and useful Combined Lighting-Valve, Primer, and Auxiliary Air-Valve, of which the following is a specification.

It is the object of my invention to provide a unitary device of simple construction for controlling the supply of fuel to automobile lamps; for supplying fuel to an automobile engine for priming, and also for emergency running as in case the normal fuel supply is exhausted; for controlling the supply of auxiliary air to the engine to dilute the explosive mixture from the carbureter, or to mix air with the priming fuel, or to supply air to the engine when coasting with the carbureter throttle closed; and for providing a convenient means for supplying kerosene for cleaning the interior of an engine cylinder.

The accompanying drawing illustrates my invention.

Figure 1 is a vertical longitudinal section through my device, showing it attached to an automobile dash board; Fig. 2 is a fragmentary section similar to Fig. 1, but showing some of the parts in a different position; Fig. 3 is section on the line 3—3 of Fig. 1; Fig. 4 is section on the line 4—4 of Fig. 1; Fig. 5 is a partial section on the line 5—5 of Fig. 3; and Fig. 6 is a view showing diagrammatically the application of my device to an automobile.

The main body 10 of my device is conveniently cylindrical in form and has at one end a main or air chamber 11, which is closed by a screw plug 12 having a sleeve extension 13 which extends through an automobile dash board 14 and may be clamped to the latter in any suitable manner, as by a clamping nut 15. A gasket 20 is seated in the inner end of the chamber 11, and upon this gasket bears a plate 21 having a square or otherwise angular central opening 22 in which fits a shouldered and similarly shaped end of a hollow stem 23 suitably pressed toward the gasket 20 as by a spring 24 and rotatable by a suitable handle 25. The hollow stem 23 extends through the spring 24, both being located within the sleeve 13. The plate 21 is provided with two eccentric openings 30 and 31, which coöperate with openings 32 and 33 respectively to form valves; said latter openings extend through the main body 10 parallel to the axis thereof and through the gasket 20, and are connected by pipes 34 and 35 to the atmosphere and to the manifold 36 of the automobile engine 37, respectively, the manifold 36 also being supplied with a fuel mixture from a suitable carbureter 36'. A check valve 34', permitting ingress only, may be located in the pipe 34, which is conveniently coiled around (or otherwise located in proximity to) the exhaust pipe 38 of the engine 37, so that air drawn through it will be heated. The gasket 20 is prevented from moving relatively to the main body 10 by means of a pin 39, which also projects through the opening 31. The opening 31 is narrow at one end and wider throughout the remainder of its length, the wide end of the opening and the shoulder between the wide and narrow portions coöperating with the pin 39 to limit the movement of the plate 21. The opening 31 is of sufficient length so that opening 33 is never completely closed. The opening 30 is tapering, and when the plate 21 is moved serves as a valve opening to vary the effective size of the opening 32 connecting the chamber 11 to the atmosphere or to close such opening completely.

A stem 40 extends centrally through the hollow stem 23 and through the gasket 20 and main body 10 into a fuel chamber 41 in the other end of the main body 10 from the chamber 11, and is provided with a flange 42 which bears against the gasket 20 and by the action of a spring 43 between such flange and a shoulder in the hollow stem 23 presses the central part of such gasket tightly against the bottom of the chamber 11. The end of the stem 40 within the fuel chamber 41 is flattened, as shown in Fig. 4, to have a sliding fit in the slotted end of a fuel valve 44 controlling the outlet of the chamber 41, between which valve and the bottom of chamber 41 is a spring 45 which prevents the valve from moving accidentally. The fuel chamber 41 has an inlet opening 46, which is connected by a pipe 47 to a source of fuel supply under pressure, such as a Prest-O-Lite tank 48.

When the stem 40 is turned by its handle 49, the flattened end of such valve stem if in engagement with the slot in the valve 44 turns the latter to vary the size of the connection from the fuel chamber 41 to the outlet 50 leading by pipes 51 to the automobile lamps 52, thus controlling the supply of fuel to such lamps. However, by pulling out (or to the right, Fig. 1) on the handle 49, the flattened end of the stem 40 is disconnected from the slotted end of the valve 44 and the flange 42 is separated from the gasket 40, thus providing an opening for the fuel from the fuel chamber 41 to pass through the central opening in the main body 10 and the gasket 20 and around the flange 42 into the space within the hollow stem 23, whence it passes, as through a transverse hole 23' in the stem 23, into the chamber 11 and thence through the opening 33, the pipe 35, and the manifold 36 into the engine, thus permitting the latter to receive a supply of priming fuel, or even supplying it with fuel for emergency running in case the normal fuel supply is exhausted. The fuel passes to the engine whatever the position of the ring 21, because of the constant uncovering of at least part of the opening 33; and is diluted with air when the opening 32 is uncovered partly or wholly. When sufficient fuel has been supplied to the engine in this manner, the handle 49 may be turned until the flattened end of the stem 40 registers with the slot in the valve 44, whereupon the spring 43 pushes the stem 40 to the left (Fig. 1) to produce reëngagement of the stem and valve and of the flange 42 and gasket 20, thus shutting off the fuel connection between the fuel chamber 41 and engine. The plate 21 may be turned by the handle 25 to allow air to be drawn in through the pipe 34, the opening 32, the chamber 11, the opening 33, and the pipe 35, to the engine; either for diluting the fuel mixture in running or priming, or for allowing ingress of air to the engine when the fuel supply from the carbureter is shut off, as when coasting.

Conveniently, the stem 40 has a central longitudinal opening 55, which is normally closed at its outer end by the screw 56 which holds the handle 49 in place, and is open at its inner end to the space within the hollow stem 23. By removing the screw 56, kerosene may be squirted from an oil can through the opening 55 into this space, whence it finds its way readily through the opening 23', chamber 11, and pipe 35 into the engine cylinders and dissolves any carbon which may be deposited therein.

I claim as my invention:—

1. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, and a valve-operating member extending through said connection between said air and fuel chambers, and detachably connected with said valve to operate the latter, said valve-operating member closing the connection between the two chambers when connected with said valve and opening said connection when disconnected from said valve.

2. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, a valve-operating member detachably connected with said valve to operate the latter, said valve-operating member closing the connection between the two chambers when connected with said valve and opening said connection when disconnected from said valve, and means for preventing accidental movement of said valve when said valve-operating member is disconnected therefrom.

3. In combination, a main body having a fuel chamber and an air chamber interconnected with each other, said fuel chamber being provided with a fuel inlet and a fuel outlet and said air chamber with an air inlet and an outlet for connection with an engine, a check valve in the air inlet, a valve controlling the outlet from said fuel chamber, and a valve-operating member detachably connected with said valve to operate the latter, said valve-operating member closing the connection between the two chambers when connected with said valve and opening said connection when disconnected from said valve.

4. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, and a valve-operating member detachably connected with said valve to operate the latter, said valve-operating member closing the connection between the two chambers when connected with said valve and opening said connection when disconnected from said valve.

5. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, a valve-operating member detachably connected with said valve to operate the latter, said valve-operating member closing the connection between the two chambers when connected with said valve and opening said connection when disconnected from said valve, and a spring tending to move said valve-operating member to its position where it engages said valve and closes said connection between the two chambers.

6. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, a valve-operating member detachably connected with said valve to operate the latter, said valve-operating member closing the connection between the two chambers when connected with said valve and opening said connection when disconnected from said valve, and a valve member movable within said air chamber and controlling ingress of air thereto.

7. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, a valve-operating member detachably connected with said valve to operate the latter, said valve-operating member closing the connection between the two chambers when connected with said valve and opening said connection when disconnected from said valve, a spring tending to move said valve-operating member to its position where it engages said valve and closes said connection between the two chambers, and a valve member movable within said air chamber and controlling ingress of air thereto.

8. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, a valve-operating member detachably connected with said valve to operate the latter, said valve-operating member closing the connection between the two chambers when connected with said valve and opening said connection when disconnected from said valve, said valve-operating member having an opening the inner end of which communicates with said air chamber, and means for opening and closing the outer end of said last named opening.

9. In combination, a main body having an air chamber and a fuel chamber, said two chambers being interconnected and each having an inlet and an outlet, a valve controlling the outlet of the fuel chamber, a valve controlling the inlet of the air chamber, and a valve stem which extends through the connection between the two chambers and is movable both longitudinally and rotatably, said valve stem having with the valve at the outlet of the fuel chamber a clutch connection which is withdrawable by the longitudinal movement of the valve stem and being spring-pressed toward clutching engagement with said valve, and said valve being operable by the rotary movement of said valve stem when the two are clutched together, said valve stem when in clutching engagement with said valve closing the connection between said two chambers and when out of such clutching engagement opening such connection.

10. In combination, a main body having an air chamber and a fuel chamber, said two chambers being interconnected and each having an inlet and an outlet, a valve controlling the outlet of the fuel chamber, and a valve stem which extends through the connection between the two chambers and is movable both longitudinally and rotatably, said valve stem having with the valve at the outlet of the fuel chamber a clutch connection which is withdrawable by the longitudinal movement of the valve stem and being spring-pressed toward clutching engagement with said valve, and said valve being operable by the rotary movement of said valve stem when the two are clutched together, said valve stem when in clutching engagement with said valve closing the connection between said two chambers and when out of such clutching engagement opening such connection.

11. In combination, a main body having an air chamber and a fuel chamber, said two chambers being interconnected and each having an inlet and an outlet, a valve controlling the outlet of the fuel chamber, a valve controlling the inlet of the air chamber, and a valve stem which extends through the connection between the two chambers and is movable both longitudinally and rotatably, said valve stem having with the valve at the outlet of the fuel chamber a clutch connection which is withdrawable by the longitudinal movement of the valve stem and said valve being operable by the rotary movement of said valve stem when the two are clutched together, said valve stem when in clutching engagement with said valve closing the connection between said two chambers and when out of such clutching engagement opening such connection.

12. In combination, a main body having an air chamber and a fuel chamber, said two chambers being interconnected and each having an inlet and an outlet, a valve controlling the outlet of the fuel chamber, and a valve stem which extends through the connection between the two chambers and is movable both longitudinally and rotatably, said valve stem having with the valve at the outlet of the fuel chamber a clutch connection which is withdrawable by the longitudinal movement of the valve stem and said valve being operable by the rotary movement of said valve stem when the two are clutched together, said valve stem when in clutching engagement with said valve closing the connection between said two chambers and when out of such clutching engagement opening such connection.

13. In combination, a main body having a fuel chamber and an air chamber interconnected with each other, said fuel chamber being provided with a fuel inlet and a fuel outlet and said air chamber with an air inlet and an outlet for connection with an engine, a valve controlling the outlet from said fuel chamber, a valve-operating member detachably connected with said valve to operate the latter, said valve-operating member closing the connection between the two chambers when connected with said valve and opening said connection when disconnected from said valve, and a valve movable in said air chamber independently of said valve-operating member and controlling the flow of air through said air chamber.

14. In combination, a main body having an air chamber and a fuel chamber, said two chambers being interconnected and each having an inlet and an outlet, a valve controlling the outlet of the fuel chamber, a valve stem which extends through the connection between the two chambers and is movable both longitudinally and rotatably, said valve stem having with the valve at the outlet of the fuel chamber a clutch connection which is withdrawable by the longitudinal movement of the valve stem and said valve being operable by the rotary movement of said valve stem when the two are clutched together, said valve stem when in clutching engagement with said valve closing the connection between said two chambers and when out of such clutching engagement opening such connection, and a valve controlling the flow of air through said air chamber.

15. In combination, a main body having an air chamber provided with an air inlet opening leading directly from the atmosphere so as to receive air substantially at atmospheric pressure, and also provided with an outlet opening for connection to an engine, a check valve in said air inlet, a manually operated valve mounted in said main body and controlling the passage of air through said air chamber to said engine, and independent manually controlled means for supplying fuel to said air chamber, said last-named means also being mounted in said main body.

16. In combination, a main body having an air chamber provided with an air inlet opening leading directly from the atmosphere so as to receive air substantially at atmospheric pressure, and also provided with an outlet opening for connection to an engine, a manually operated valve mounted in said main body and controlling the passage of air through said air chamber to said engine, and independent manually controlled means for supplying fuel to said air chamber, said last-named means also being mounted in said main body.

17. In combination, a main body having an air chamber provided with an air inlet opening and also with an outlet opening for connection to an engine, a plate manually rotatable within said chamber to variably cover and uncover one of such openings, and means independent of such plate for supplying fuel to said chamber.

In witness whereof, I, CHARLES M. JEWELL have hereunto set my hand at Canastota, S. D., this 16" day of June, A. D., one thousand nine hundred and thirteen.

CHARLES M. JEWELL.

Witnesses:
LEONARD NOTEBOOM,
JAMES ARMTRY.